United States Patent
Dratva

(10) Patent No.: US 9,630,247 B2
(45) Date of Patent: Apr. 25, 2017

(54) GUIDE ROLLER FOR GUIDING A STRAND IN A STRAND CASTING SYSTEM

(71) Applicant: SMS CONCAST AG, Zurich (CH)

(72) Inventor: Christian Dratva, Zurich (CH)

(73) Assignee: SMS Concast AG, Zurich (CH)

( * ) Notice: Subject to any disclaimer, the term of this patent is extended or adjusted under 35 U.S.C. 154(b) by 0 days.

(21) Appl. No.: 14/415,287

(22) PCT Filed: Jul. 19, 2013

(86) PCT No.: PCT/EP2013/065276
§ 371 (c)(1),
(2) Date: Jan. 16, 2015

(87) PCT Pub. No.: WO2014/013050
PCT Pub. Date: Jan. 23, 2014

(65) Prior Publication Data
US 2015/0183027 A1    Jul. 2, 2015

(30) Foreign Application Priority Data
Jul. 20, 2012   (EP) ..................................... 12005307

(51) Int. Cl.
*B22D 11/128*   (2006.01)
*B22D 29/04*    (2006.01)
(Continued)

(52) U.S. Cl.
CPC .......... *B22D 29/04* (2013.01); *B22D 11/1281* (2013.01); *B22D 11/1282* (2013.01);
(Continued)

(58) Field of Classification Search
CPC ............ B22D 11/1281; B22D 11/1282; B22D 11/1287; B22D 29/04
(Continued)

(56) References Cited

U.S. PATENT DOCUMENTS 4,905,754 A    3/1990    Kimura et al.
5,240,198 A    8/1993    Doerfel
(Continued)

FOREIGN PATENT DOCUMENTS

AU    63163/90 B    4/1991
CA    1162022 A     2/1984
(Continued)

OTHER PUBLICATIONS

Abstract of JP S 6372457.
(Continued)

*Primary Examiner* — Kevin P Kerns
(74) *Attorney, Agent, or Firm* — Brian Roffe

(57) ABSTRACT

Guide roller including a bearing journal at each of two ends. Each bearing journal is provided with a plain bearing designed as a hollow journal, and can be connected to the coolant supply line to conduct coolant through the hollow journal into or out of the coolant channel. The plain bearing is lubricated by coolant conducted through the bearing journal. A roller assembly for a strand casting system is provided with a plurality of guide rollers. The guide rollers are arranged at an axial distance from each other along a strand produced by the strand casting system and are each rotatably supported in a respective bearing mount. Each bearing mount is arranged on at least one frame part in a preloaded manner The bearing mounts are supported on the frame parts so as to be self-setting by elastically pliable connecting structure.

15 Claims, 6 Drawing Sheets

(51) Int. Cl.
*F27D 3/02* (2006.01)
*F16C 17/02* (2006.01)
*F16C 33/02* (2006.01)
*F16C 37/00* (2006.01)

(52) U.S. Cl.
CPC .......... *B22D 11/1287* (2013.01); *F16C 17/02* (2013.01); *F16C 33/02* (2013.01); *F16C 37/00* (2013.01); *F27D 3/026* (2013.01)

(58) Field of Classification Search
USPC .................................. 164/269, 442, 448
See application file for complete search history.

(56) References Cited

U.S. PATENT DOCUMENTS

| | | | |
|---|---|---|---|
| 7,325,586 | B2 | 2/2008 | Diebl et al. |
| 7,617,862 | B2 | 11/2009 | Guttenbrunner et al. |
| 8,267,154 | B2 | 9/2012 | Springmann et al. |
| 8,302,662 | B2 | 11/2012 | Kawa et al. |
| 8,631,854 | B2 | 1/2014 | Dratva et al. |
| 8,845,501 | B2 | 9/2014 | Lechner et al. |
| 2003/0136543 | A1* | 7/2003 | Eisenmann et al. ........................ B22D 11/1287 164/448 |
| 2011/0114282 | A1* | 5/2011 | Hovestadt et al. ....... F28F 5/02 164/448 |

FOREIGN PATENT DOCUMENTS

| | | |
|---|---|---|
| CA | 2094815 A1 | 5/1992 |
| CN | 102310083 A | 1/2012 |
| DE | 1583619 A1 | 8/1970 |
| DE | 3823655 A1 | 1/1990 |
| DE | 19506871 C1 | 9/1996 |
| DE | 102011050728 A1 | 12/2012 |
| EP | 0101661 A1 | 2/1984 |
| EP | 1136156 A | 9/2001 |
| EP | 1142659 A1 | 10/2001 |
| GB | 424359 A | 2/1935 |
| JP | 6372457 S | 4/1988 |
| JP | 0299253 A | 4/1990 |
| WO | 2009141210 A1 | 11/2009 |
| WO | 2013160476 A2 | 10/2013 |

OTHER PUBLICATIONS

Abstract of EP 1136156.
Abstract of JPH-A 0299253 retrieved Mar. 8, 2016.
Abstract of CN 102310083 retrieved Mar. 8, 2016.
Abstract of DE 3823655 retrieved Aug. 24, 2016.
Abstract of DE 19506871 retrieved Aug. 24, 2016.
Abstract of DE 102011050728 retrieved Aug. 24, 2016.
Abstract of EP 1142659 retrieved Aug. 24, 2016.
Abstract of EP 0101661 retrieved Aug. 24, 2016.

* cited by examiner

GUIDE ROLLER FOR GUIDING A STRAND IN A STRAND CASTING SYSTEM

FIELD OF THE INVENTION

The invention relates to a guide roller for guiding a strand in a strand casting system configured to be mounted rotatably in a bearing mount and connected to a coolant supply line. The invention also relates to a roller assembly for a strand casting system having a plurality of guide rollers provided as support roller and which are arranged an axial distance apart from one another along a strand produced by the strand casting system and are respectively mounted rotatably in a bearing mount, the bearing mounts respectively being arranged, preloaded, on at least one frame part.

BACKGROUND OF THE INVENTION

Strand casting systems for the discontinuous or continuous production of billets, slabs or the like are known from the prior art.

Rotatably mounted guide rollers are used in the known strand casting systems to guide and cool the metal strand after it leaves the mould. These guide rollers are cooled by water on the inside or on the outside. In order to guarantee the supporting function the axial distances between these rollers must be set precisely depending on the shrinkage behaviour of the casting strand, and this is very time-consuming and can lead to losses of quality and production if these distances are not set sufficiently.

Generic guide rollers of a roller assembly for a strand casting system is known from JP 63072457-A. This roller assembly comprises a plurality of guide rollers which are respectively arranged an axial distance apart from one another along the strand produced by the strand casting system. In the roller assembly of JP-A-63072457 three rows of different guide rollers are provided, a first row of guide rollers being disposed adjacent to the mould exit and comprising a number of rollers with a first diameter arranged a distance apart from one another in the longitudinal direction of the strand that is produced. Adjoining this in the strand direction is a second row of guide rollers which comprises a plurality of guide rollers that have a smaller diameter than the guide rollers of the first row. This second row of guide rollers serves to divert the strand that is produced. Adjoining the second row is a third row of guide rollers which has a plurality of guide rollers that have a larger diameter in comparison to the second row.

As the operating duration of a strand casting system increases, the cross section of the strand becomes greater due to wear of the mould. This gives rise to the problem that the guide rollers, that are arranged in a fixed manner relative to the mould, do not apply the same pressing force to the surface of the strand that is produced over the whole period of use. This may lead to reduced quality of the strand profile that is produced and/or to increased breakout frequency. Moreover, the rollers have to be re-adjusted due to wear from the strand, and this is also labour-intensive and time-consuming.

OBJECTS AND SUMMARY OF THE INVENTION

Proceeding from here, the object underlying the invention is to devise a guide roller for guiding a strand in a strand casting system wherein the guide rollers can be provided with a small diameter and nevertheless work with consistent rigidity during casting.

This object is achieved with a guide roller for guiding a strand in a strand casting system configured to be mounted rotatably in a bearing mount and connected to a coolant supply line. The guide roller includes a roller core, a roller jacket disposed around the roller core, a coolant channel being defined between the roller core and the roller jacket, and a respective bearing journal situated on each side of the roller core. The bearing journals have a hollow interior in flow communication with the coolant supply line to enable coolant to flow between the coolant channel and the coolant supply line through the hollow interior of at least one of the bearing journals. There is only a single through hole or channel in each bearing journal for coolant flow. At least one bearing, e.g., a plain bearing or a roller bearing, is interposed between each bearing journal and the roller jacket and situated under the roller jacket. The bearings enable rotation of the roller core and roller jacket relative to the bearing mount.

The guide roller according to the invention has on both sides a bearing journal that is mounted rotatably in a bearing mount by means of a plain bearing or a roller bearing. The two bearing journals are respectively in the form of hollow journals here and can be connected to the coolant supply line, the plain bearing being lubricated by the coolant that is conducted through the bearing journal designed as a hollow journal.

The roller diameters can therefore be made to be very small and consequently the distances between the guide rollers can also be minimised. With this design of the guide rollers thinner strand shells can be guided better with, for example, faster casting.

In this exemplary embodiment it is proven to be particularly advantageous to use a plain bearing for mounting the guide roller in the bearing mount. In this embodiment the coolant conducted through the bearing journals designed as hollow journals can at the same time serve as lubricant and coolant for the plain bearing.

In order to enable this cooling of the guide rollers, which is as efficient as possible, the guide rollers according to the invention have a cylindrical roller core around which a roller jacket is disposed. The roller core has on its outer circumference a substantially helical coolant channel. This helical coolant channel can be connected to a coolant supply line through which a coolant is conducted. The helical design of the coolant channel guarantees even cooling of the guide roller over the entire width of the roller. With this relatively intensive cooling in the thin rollers it is guaranteed that these rollers will remain dimensionally stable and will not bend due to thermal stresses.

It is thus guaranteed that the guide rollers at all times rest against the surface of the strand that is produced with optimal contact pressure and that the most efficient possible cooling of the guide roller takes place over its entire guide surface. The strand passing out of the mould should be supported and guided here, but not be subjected to unnecessary forces, for example due to incorrectly set roller positions.

The roller assembly according to the invention for a strand casting system comprises a plurality of guide rollers which are arranged a distance apart from one another along the strand produced by the strand casting system and are respectively mounted rotatably in at least one bearing mount. The bearing mounts are respectively mounted spring-elastically here on a frame or frame part. The frame part is advantageously a component part of the system or of a frame securely connected to the mould.

By means of the spring-elastic mounting of the bearing mounts, the guide rollers that are mounted rotatably in the bearing mounts are pressed, so as to be self-setting, against the surface of the strand that is produced. Even if the strand cross section of the strand that is produced changes during the operating duration or due to changed process parameters of the strand casting system, the originally set pressing force of the guide rollers remains substantially unchanged because the position of the guide rollers can be adapted to the strand cross section due to the spring-elastic mounting of the bearing mounts.

Due to a lack of contact between the rollers and the strand surface or due to rollers jamming due to overheating of the mounting, surface faults may occur on the strand in the form of longitudinal scratches or the like.

This roller assembly according to the invention can also be brought about very easily because the rollers do not have to be pre-set very accurately in relation to the strand cross section.

Advantageously, the bearing mounts are mounted spring-elastically on the frame or frame parts by means of spring-elastic connecting means. The spring-elastic connecting means can be, for example, brackets, straps, disc or leaf springs made of spring steel. The spring-elastic connecting means can also be formed by pressure springs, in particular gas pressure springs or by torsion springs.

Preferably, the spring-elastic connecting means have a linear spring characteristic curve in order to guarantee the best possible adaptation of the position of the guide rollers in relation to the strand that is produced and so a constant contact pressure. By appropriately selecting or adapting the spring-elastic connecting means, the contact pressure with which the guide rollers are pressed onto the surface of the strand can initially be set to an optimal value. The initially set contact pressure then also remains substantially unchanged over the further operating duration of the strand casting system due to the spring-elastic mounting of the bearing mounts because the position of the guide rollers adapts to the cross section of the strand produced if the latter changes with the increasing operating duration of the strand casting system, for example due to wear of the mould or as a result of changed process parameters.

In order to enable the simplest possible and optimal adaptation of the contact pressure or pressing force, the spring-elastic connecting means, by means of which the bearing mounts are mounted on the frame parts, are formed by gas pressure springs the spring pressure of which can be set and adapted easily. It has proven to be particularly advantageous to set a pressing force that depends on the position of the respective guide roller and the casting format at between 100 N and 1200 N.

Depending on the requirements, the guide rollers can be arranged, for example, on two opposing sides of the strand that is produced, or also they can be arranged such that they surround the strand on all sides. It is also possible to arrange the guide rollers on just the lower side of the strand. Corresponding arrangements of the guide rollers in the form of roller cages, double rollers or single rollers are known from the prior art.

In order to support the strand that is produced the smallest possible distances away from the rollers and to guide it correctly, it is advantageous to use in the roller assembly guide rollers with a smaller diameter in comparison to the guide rollers known from the prior art. These guide rollers with a small diameter are arranged the smallest possible axial distance apart from one another (pitch) and lying one behind the other in the longitudinal direction of the strand that is produced. These small roller distances reduce bulging of the strand shell as a result of the ferrostatic internal pressure in the strand, and this leads to increased operational reliability and an improvement of quality within the strand.

BRIEF DESCRIPTION OF THE DRAWINGS

Exemplary embodiments and further advantages of the invention are described below by means of the accompanying drawings. The drawings show as follows.

DETAILED DESCRIPTION OF THE INVENTION

Figure 1:
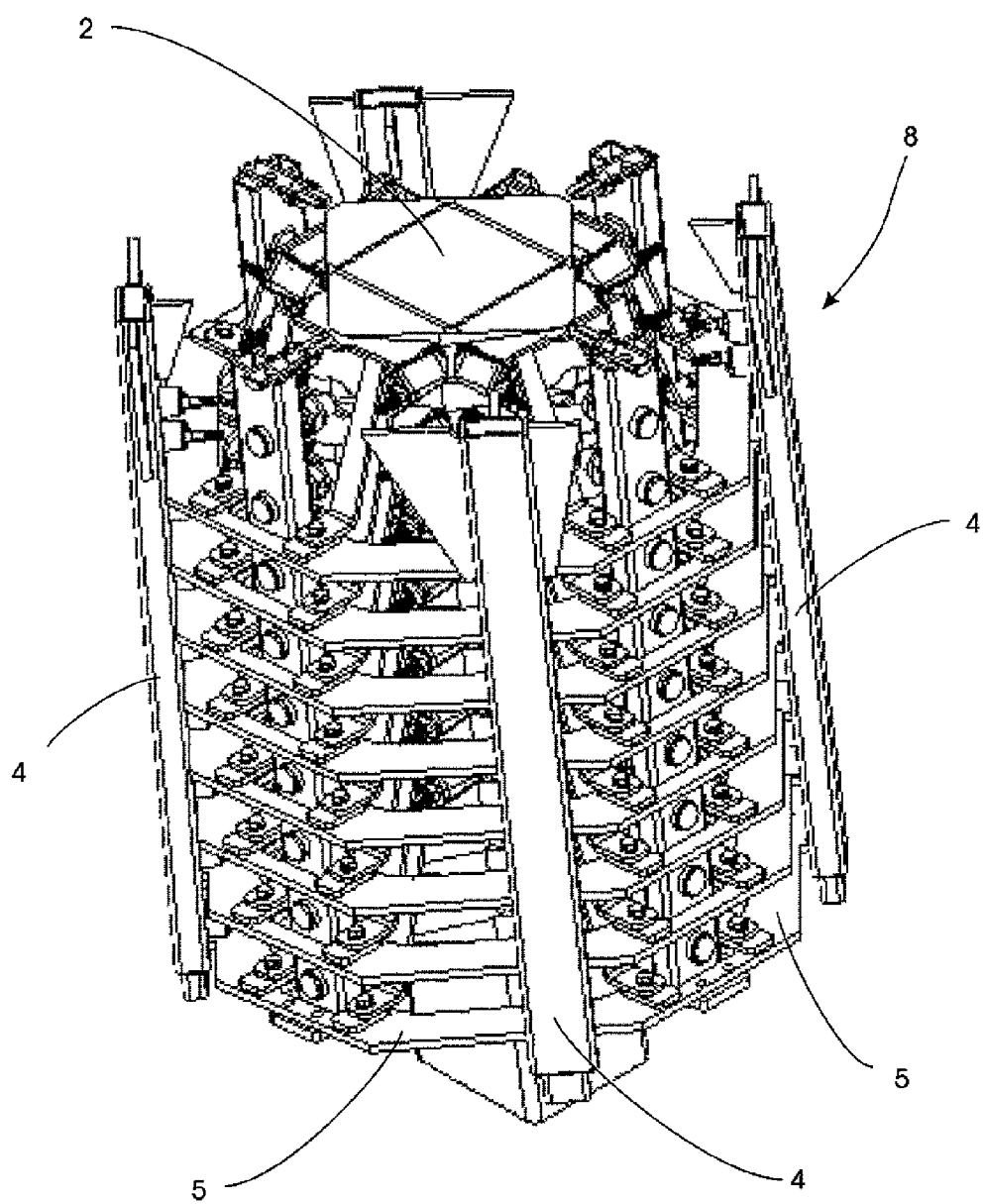
FIG. 1 is a perspective illustration of a roller assembly according to the invention for a strand casting system.
Figure 2:
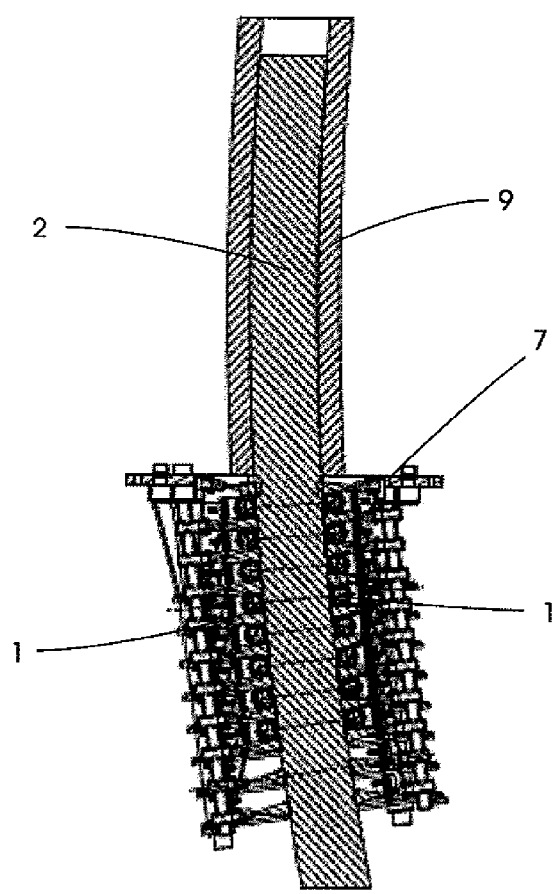
FIG. 2 is a longitudinal section through the roller assembly of FIG. 1.

The roller assembly for a strand casting system shown in FIG. 1 and FIG. 2 comprises a frame 8 which is preferably connected securely to a mould 9 of the strand casting system. The frame 8 oscillates here with the oscillation of the mould 9 or is fastened securely along the casting length like a guide segment. The strand 2 that is produced, in particular from steel, is guided within the mould 9. The strand passing out of the mould 9 must therefore be supported and guided by means of a roller assembly. In order to enable cooling of the strand 2 at the same time, the roller assembly comprises cooled guide rollers 1.

Figure 3:
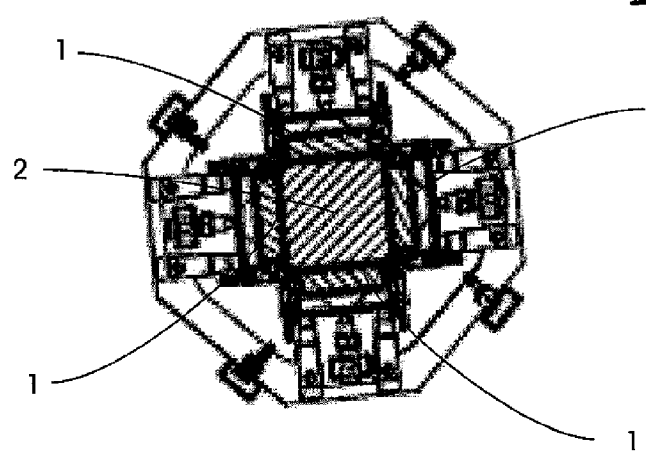
FIG. 3 is a cross section through the roller assembly of FIG. 2, along line B-B.

As can be seen in particular from the cross-sectional illustration of FIG. 3, the guide rollers 1 in the exemplary embodiment shown here are arranged on all four sides of the strand 2 with a rectangular cross section. However, other arrangements, as known from the prior art, are possible with the roller assembly according to the invention.

As can be seen from FIG. 2, a number of guide rollers 1 are arranged one behind the other and an axial distance apart from one another on each side in the longitudinal direction of the strand 2. The axial distance between adjacent guide rollers 1 is advantageously at least 50 mm here, and at most 200 mm, and this is preferably in the first 2 to 3 metres after the mould. Preferably, axial distances of less than 100 mm are chosen. Axial distances between axially adjacent guide rollers of for example 70 mm have proven to be particularly suitable with a guide roller diameter of 45 mm.

Figure 6A:
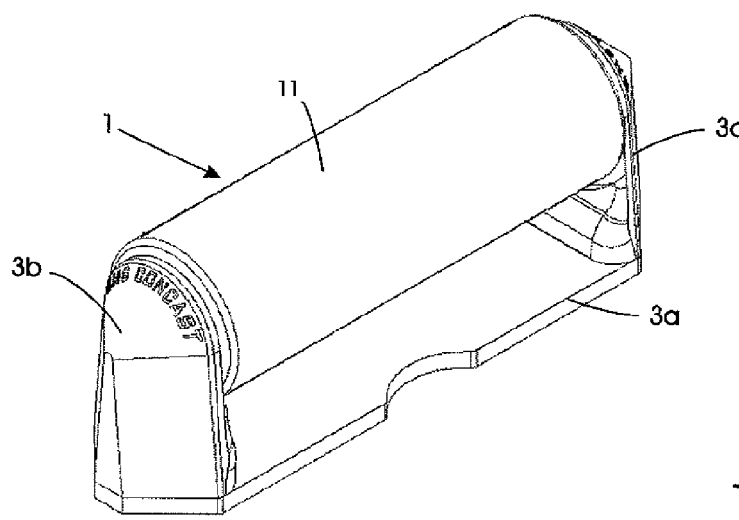
FIG. 6 is an illustration of a guide roller according to the invention in a perspective view (FIG. 6A), a view shown partially opened up (FIG. 6*b*) and a cross sectional illustration (FIG. 6*c*)

The guide rollers 1 are respectively mounted so as to rotate individually in a bearing mount 3. Each bearing mount 3 comprises a base plate 3*a* in the form of a plate here and two mountings 3b, 3c arranged upright on the latter (FIG. 6). The base plate 3a is spring-elastically mounted on the frame 8 by means of spring-elastic connecting means 6.

Figure 4:
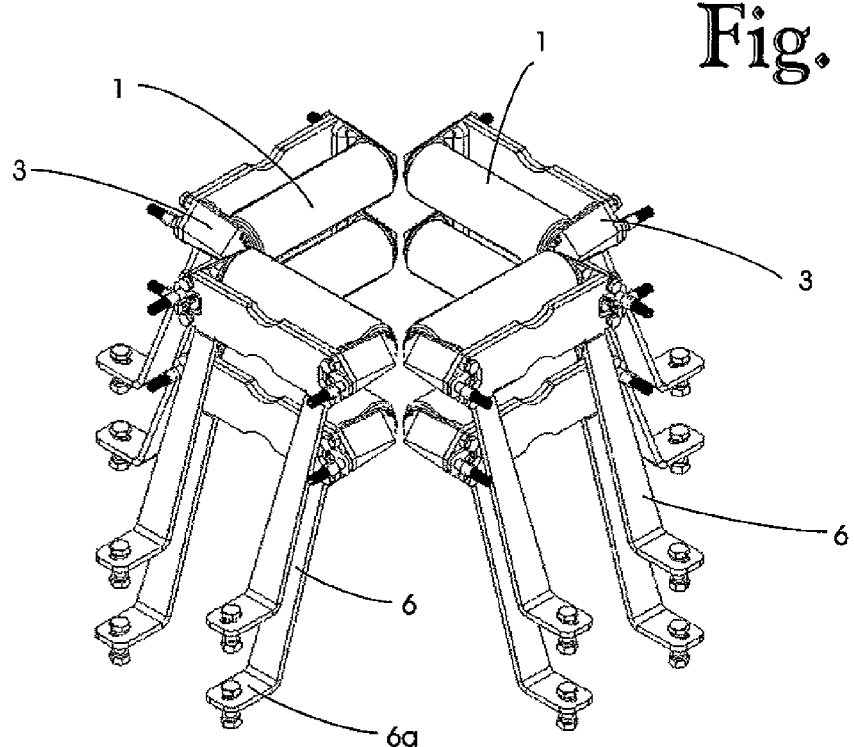
FIG. 4 is a perspective illustration of a number of guide rollers of the roller assembly of FIG. 1.
Figure 5:
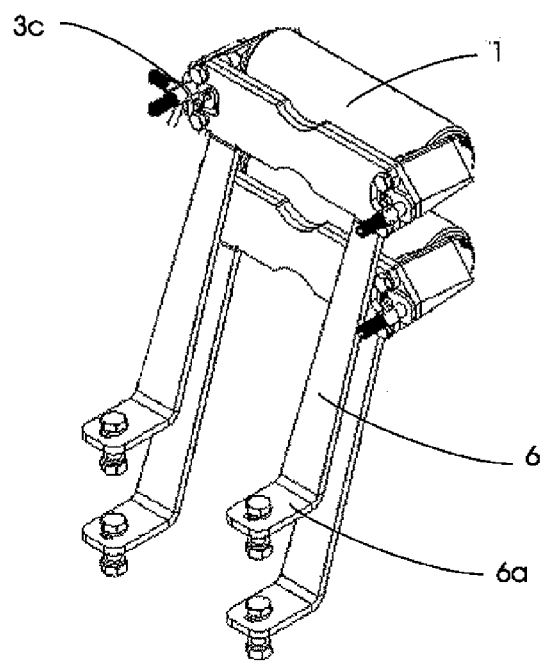
FIG. 5 is a perspective illustration of the spring-elastic connecting means which serve to fasten the guide rollers according to FIG. 4 to a frame.

According to FIG. 4 and FIG. 5, the spring-elastic connecting means 6 are formed by brackets made of spring steel, two such brackets or straps made of spring steel being provided for each base plate 3a. Each bearing mount 3 is mounted spring-elastically on the frame 8 by means of these spring-elastic connecting means 6.

In the exemplary embodiment shown in FIG. 1 to FIG. 3 the frame 8 comprises vertical frame parts 4 and horizontal frame part 5 fastened to the latter. The vertical frame parts 4 extend around the strand 2 in the longitudinal direction of the strand and are preferably fastened to a flange 7 fastened to the mould 9. Extending between the vertical frame parts 4 are horizontal frame parts 5 spaced apart from one another and arranged in parallel over one another to which the foot parts 6a of the spring-elastic connecting means 6 are fastened, in particular screwed on.

This roller assembly offers another advantage, namely that these spring-elastic brackets can be arranged a small distance over one another and this makes these small distances between the guide rollers possible.

By means of this arrangement that is shown, the guide rollers 1 are pressed onto the surface of the strand 2 with a pre-specified and settable pressing force due to the spring-elastic mounting of the bearing mounts 3. The pressing force or the contact pressure can be set here by appropriately selecting or adapting the spring-elastic connecting means 6 to a desired value. If the spring-elastic connecting means 6 are for example brackets made of spring steel, the contact pressure can be varied by the thickness of the brackets. Advantageously, the spring-elastic connecting means 6 are formed by pressure springs. With these pressure springs a desired spring pressure and so a desired pressing force of the guide rollers 1 on the surface of the strand 2 can be set. Advantageously a pressing force of between 100 N and 1200 N is chosen depending on the position and casting format.

When the strand casting system starts to cast, a start-up strand (cold strand) is first of all introduced into the mould 9, and the strand initially seals the mould exit. The molten metal which is then poured into the mould 9 then hardens on the start-up head and is drawn out of the mould 9 with the latter. The guide rollers 1, which are preloaded by the spring force of the spring-elastic connecting means 6, are pressed (radially) outwards, i.e. away from the start-up head, and then rest against the surface of the strand 2 with a pre-specified pressing force due to the preloading of the connecting means 6.

Figure 6B:
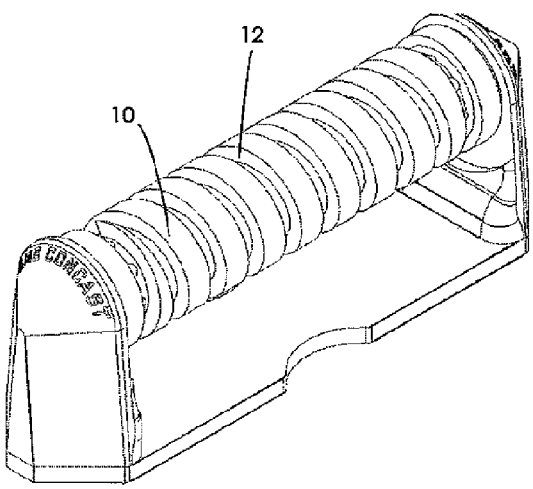
Figure 6C:
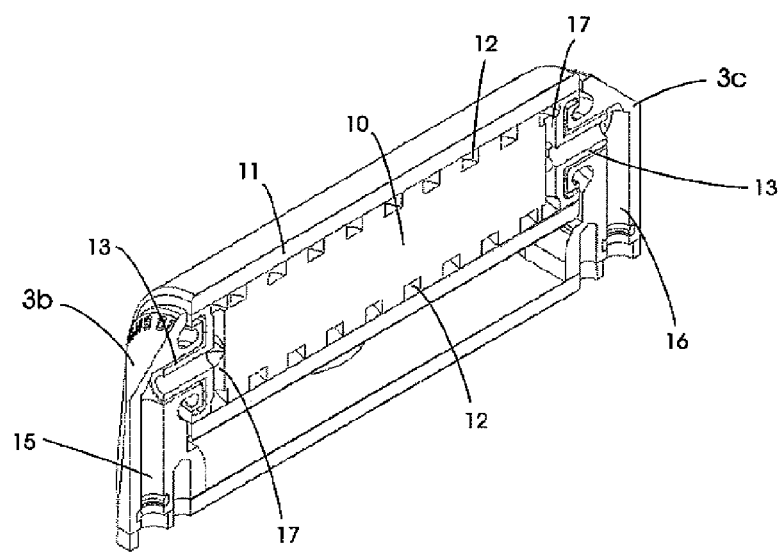

FIG. 6 shows a first exemplary embodiment of a guide roller according to the invention. This guide roller is mounted rotatably in a bearing mount 3, the bearing mount 3 having a plate-shaped base plate 3a and two mountings 3b, 3c arranged upright on the base plate 3a. The guide roller 1 is rotatably mounted on both sides in the mountings 3b, 3c of the bearing mount 3 and it comprises a cylindrical roller core 10 and a roller jacket 11, that is cylindrical in form, disposed around the roller core 10 (FIG. 6b and FIG. 6c). On the outer circumference or its outer circumferential surface, the cylindrical roller core 10 has a substantially helical coolant channel 12 which is formed by a helical groove in the outer circumference or outer circumferential surface of the roller core 10 and is delimited on the outside by the inner circumference or inner circumferential surface of the roller jacket 11. The roller jacket 11 is preferably a shrinking part made of metal which is shrunk onto the roller core 10 by heat.

According to FIG. 6c the guide roller 1 comprises on each of its two face sides a bearing journal 13 which is in the form of a hollow journal with a through hole. The two bearing journals 13 of the guide roller 1 with a plain bearing 14 respectively surrounding the latter is mounted in the mountings 3b, 3c of the bearing mount 3. A feed channel 15 and a discharge channel 16 for a coolant are provided in the mountings 3c, 3b of the bearing mount 3. The channels 15 and 16 are connected to a coolant circuit and are connected to the through hole of the bearing journals 13 in the form of hollow journals for the conveyance of a coolant through the guide roller 1.

Provided within the roller core 10 are radial connecting channels 17 by means of which the helical coolant channel 12 is connected to the borehole in the bearing journals 13. By means of this arrangement a coolant line is formed by means of which a coolant can be guided through the guide roller 1. Due to the helical form of the helical coolant channel 12 in the roller core 10 it is guaranteed that even cooling, in particular of the roller jacket 11, takes place over the entire width of the guide roller 1.

Figure 7:
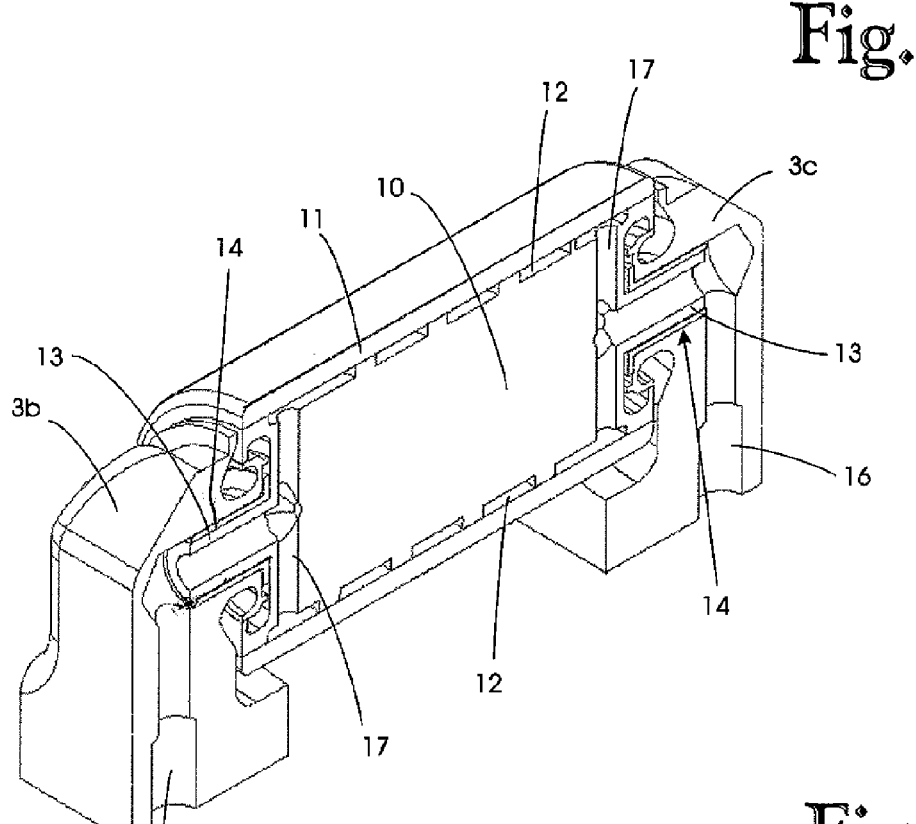
FIG. 7 is a section of another embodiment of a guide roller according to the invention.

In the version according to FIG. 7 the respective bearing journal 13 is made as a component of the roller core 10 and projects into the bearing mount 3 in which it is surrounded by an outer plain bearing 14. The channel 15 in the bearing mount 3 in the latter has dimensions such that it surrounds the outer plain bearing 14 on the face side so that the coolant can flow in between the plain bearing 14 and the bearing mount 3. This inflowing coolant, which is preferably water, thus contributes to the lubrication of the plain bearing 14. The lubricating effect is increased here as the operating duration of the strand casting system increases because the bearing play becomes greater and so more coolant fluid can penetrate into the bearing 14. When lubricating the plain bearings with water as a coolant, unlike with conventional bearing lubrication, there is no contamination of the water cooling circuit with oil-based lubricants. In addition, the spring-elastic positioning makes it possible to compensate for the wear of the plain bearing bushings.

Figure 8:
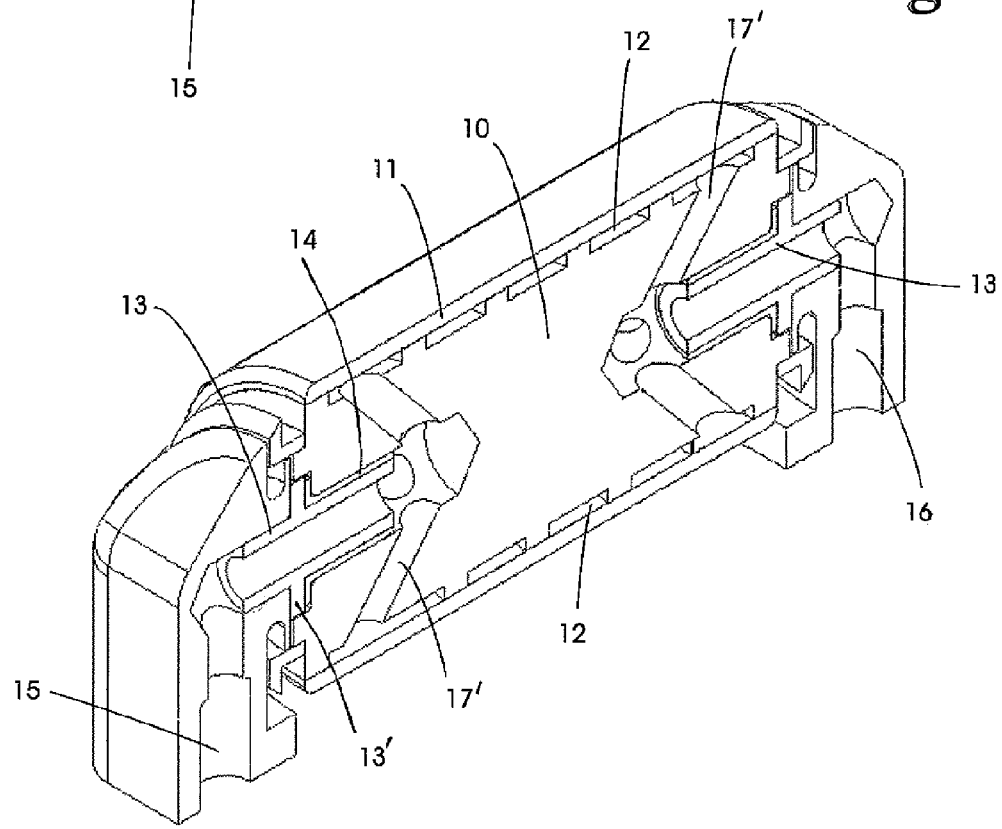
FIG. 8 is a section of another embodiment of a guide roller according to the invention.

With the guide roller according to FIG. 8 the respective bearing journal 13 is made as a separate element in which the outer plain bearing 14 of the bearing journal is disposed in the roller core 10 and, lying opposite, the bearing journal 13 penetrates into the bearing mount 3. The channel 17' has dimensions in the centre of the roller core here such that it surrounds the outer plain bearing 14 on the face side so that the coolant can flow in between the plain bearing 14 and the roller core 10. Another flange 13' is assigned to the bearing journal 13 by means of which it is positioned in the axial direction.

In principle, in the version according to FIG. 8 the bearing journal 13 could be produced as a component part of the bearing mount 3, and not as a separate element.

In this embodiment, very efficient cooling of the peripheral regions of the guide roller 1 is provided. This is guaranteed here by feed channels 17' running obliquely within the roller core 10, by means of which the helical coolant channel 12 is connected to the feed channel 15 or the discharge channel 16.

Figure 9:
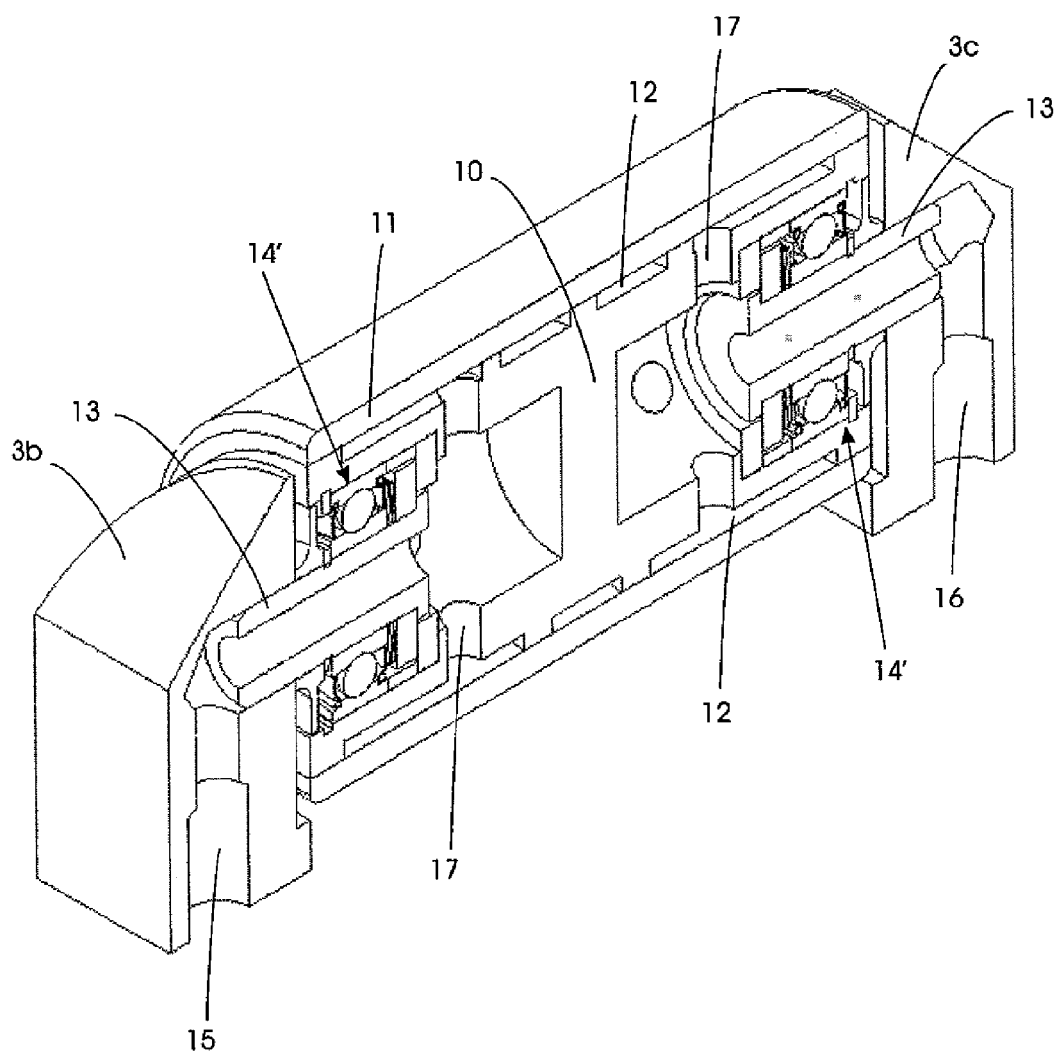
FIG. 9 is a section of another embodiment of a guide roller according to the invention.

FIG. 9 shows a version of a guide roller according to the invention, a roller bearing 14' being used in this embodiment instead of the plain bearing 14 for the mounting of the guide roller in the bearing mount 3.

Within the framework of the invention the bearing mounts could also be fastened in the manner of a module to a number of frame parts arranged separately from one another.

Furthermore, the bearing journal 13 and the plain bearing 14 could be produced as one part, the bearing journal being able to be coated with a good conductive material in the region of the bearing. With the plain bearing, a different supply could also be provided by means of one or more through holes in the bearing journal through which the coolant is guided to the plain bearing in order to bring about lubrication, cooling and/or flushing in the same.

An inflexible roller bearing or a roller bearing provided with a high degree of rigidity could also be provided, in particular on the fixed side (on the outside), as could an elastic mounting of the roller bearing on the other three long sides of the strand. The rigidity of the springs could be configured to vary from one roller plane to the next in the direction of casting, preferably depending on the shell rigidity of the strand.

The invention claimed is:

1. A guide roller for guiding a strand in a strand casting system configured to be mounted rotatably in a bearing mount and connected to a coolant supply line, the guide roller comprising:
   a roller core;
   a roller jacket disposed around the roller core, a coolant channel being defined between the roller core and the roller jacket;
   a respective bearing journal situated on each side of the roller core, at least one of the bearing journals being hollow and consisting of a single through hole through which coolant flows when flowing through the bearing journal, the single through hole of the at least one of the bearing journals having an opening that leads into a respective interior space of the roller core, the roller core including at least one radial connecting channel having an opening in flow communication with the interior space of the roller core and another opening in flow communication with the coolant channel such that coolant operatively flows through the at least one radial connecting channel when flowing between the coolant channel and the single through hole of the at least one of the bearing journals; and
   at least one bearing situated radially outward of each of the bearing journals and configured to enable rotation of the roller core and the roller jacket relative to the bearing mount, and
   wherein the at least one bearing includes a plain bearing that surrounds the respective one of the bearing journals such that each of the bearing journals is surrounded by a respective plain bearing, and
   wherein the plain bearing is disposed in the roller core, and
   wherein the at least one radial connecting channel has dimensions such that the at least one radial connecting channel has a portion that surrounds the plain bearing to enable coolant to flow between the plain bearing and the roller core so that at least one of lubrication, cooling and flushing of the plain bearing is provided.

2. The guide roller according to claim 1, wherein the coolant channel is helical.

3. The guide roller according to claim 1, wherein the coolant channel is defined on an outer circumference of the roller core between opposite axial ends of the guide roller.

4. The guide roller according to claim 1, wherein the coolant channel is defined by a helical groove in an outer circumference of the roller core and is delimited by an inner circumferential surface of the roller jacket.

5. The guide roller according to claim 1, wherein the coolant channel is defined on an inner side by an outer circumferential surface of the roller core and is defined on an outer side by an inner circumferential surface of the roller jacket such that the coolant operatively flows against the outer circumferential surface of the roller core and against the inner circumferential surface of the roller jacket when flowing through the coolant channel.

6. The guide roller according to claim 1, wherein the roller core is cylindrical and the roller jacket is cylindrical and both extend from one end of the guide roller to an opposite end of the guide roller.

7. The guide roller according to claim 1, wherein the at least one bearing associated with the at least one of the bearing journals is situated radially outward of the at least one of the bearing journals and under the roller jacket such that the roller core and roller jacket rotate relative to the bearing mount and the at least one of the bearing journals.

8. The guide roller according to claim 1, wherein each of the at least one bearing is situated under the roller jacket, each of the bearing journals being hollow and consisting of a single through hole through which coolant flows when flowing through the bearing journal, the roller core having a solid region between the interior spaces.

9. The guide roller according to claim 1, wherein the other one of the bearing journals is hollow and consists of a single through hole through which coolant operatively flows when flowing between the coolant channel and the coolant supply line, the bearing journals being separate parts and separate from the roller core.

10. The guide roller according to claim 1, wherein each of the at least one bearing is arranged with an inner radial side against an associated one of the bearing journals and an outer side against the roller core.

11. The guide roller according to claim 1, wherein the at least one radial connecting channel is an oblique channel.

12. A guide roller for guiding a strand in a strand casting system configured to be mounted rotatably in a bearing mount and connected to a coolant supply line, the guide roller comprising:
   a roller core;
   a roller jacket disposed around the roller core, a coolant channel being defined between the roller core and the roller jacket;
   a respective bearing journal situated on each side of the roller core, at least one of the bearing journals being hollow and consisting of a single through hole through which coolant flows when flowing through the bearing journal; and
   at least one bearing situated radially outward of each of the bearing journals and configured to enable rotation of the roller core and the roller jacket relative to the bearing mount,
   wherein the at least one bearing includes a plain bearing that surrounds the respective one of the bearing journals such that each of the bearing journals is surrounded by a respective plain bearing, and
   wherein each of the bearing journals projects into a respective one of the bearing mounts and is surrounded by the respective plain bearing in the bearing mount, one of the bearing mounts includes a feed channel through which coolant operatively flows into the single through hole of the at least one of the bearing journals, the feed channel having dimensions such that the feed channel has a portion that surrounds the plain bearing to enable coolant to flow between the plain bearing and the bearing mount so that at least one of lubrication, cooling and flushing of the plain bearing is provided.

13. The guide roller according to claim 12, wherein the single through hole of the at least one of the bearing journals has an opening that leads into an interior space of the roller core, and the roller core includes at least one radial connecting channel having an opening in flow communication with the interior space of the roller core and another opening in flow communication with the coolant channel such that coolant operatively flows through the at least one radial connecting channel when flowing between the coolant channel and the single through hole of the at least one of the bearing journals.

14. The guide roller according to claim 12, wherein at least one of the bearing journals is a component part of the roller core and the at least one bearing associated with the at least one of the bearing journals is situated radially outward of the at least one of the bearing journals such that the at least one of the bearing journals rotates with the roller core and roller jacket relative to the bearing mount.

15. The guide roller according to claim 12, wherein each of the at least one bearing is arranged between the roller core and an associated one of the bearing journals.

\* \* \* \* \*